Feb. 6, 1962 J. RABINOW 3,019,876
FAST RESPONSE MAGNETIC FRICTION CLUTCH
Filed Jan. 6, 1960 2 Sheets-Sheet 1

INVENTOR
Jacob Rabinow
BY *Max L. Libman*
ATTORNEY

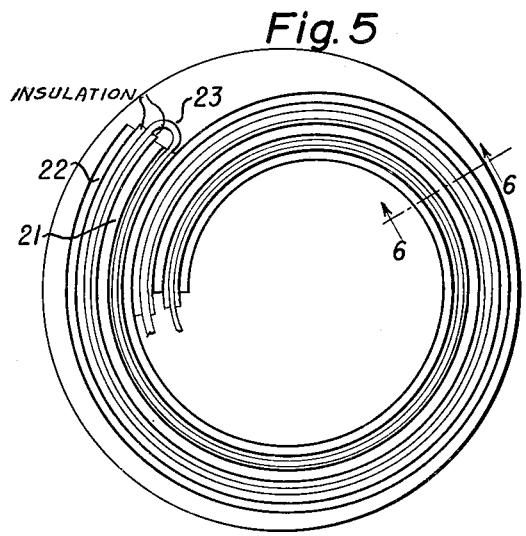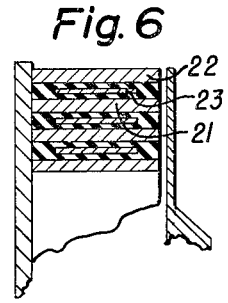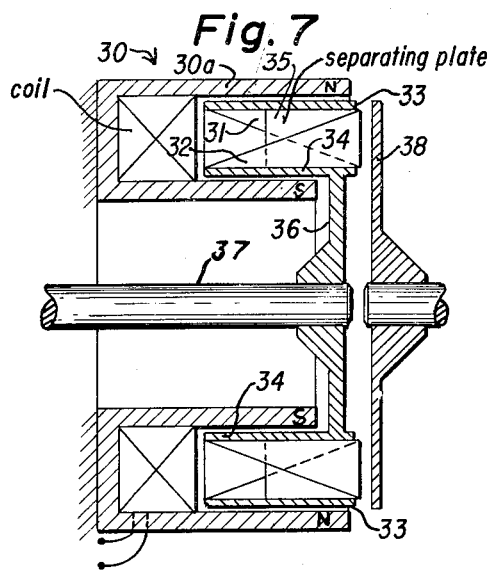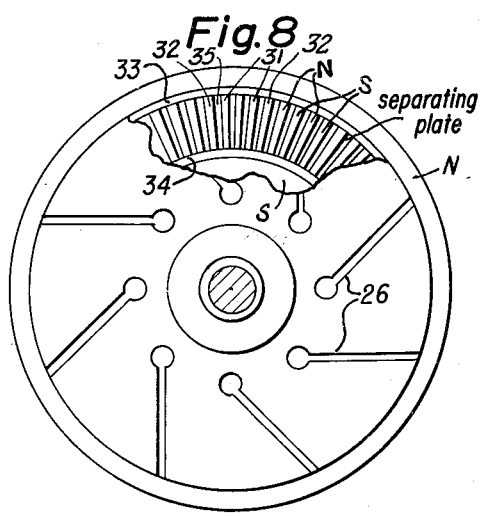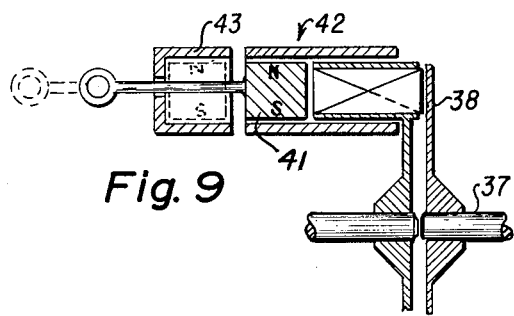

United States Patent Office 3,019,876
Patented Feb. 6, 1962

3,019,876
FAST RESPONSE MAGNETIC FRICTION CLUTCH
Jacob Rabinow, Takoma Park, Md., assignor, by direct and mesne assignments, to Rabinow Engineering Co., Inc., Rockville, Md., a corporation of Maryland
Filed Jan. 6, 1960, Ser. No. 877
7 Claims. (Cl. 192—84)

This invention relates to the art of magnetically actuated friction clutches or brakes, generally called couplings, wherein an electro-magnet attracts one or more plates into frictional engagement with itself or with each other.

In the prior art when large forces were needed, heavy magnetic structures were employed using thick magnetic sections including the armature. For several reasons this resulted in relatively slow acting devices. The thick sections resulted in eddy-current effects which opposed the fast build-up of flux. The heavy armatures moved toward the magnets slowly because of their inertia, and also had large moments of inertia, both of which effects produced relatively slow acting couplings.

It is a major object of the invention to provide a heavy-duty clutch which is capable of very fast operation because the armature or moving clutch element is made extremely thin and light in weight, yet it is capable of transmitting all of the magnetic force that the device can produce at magnetic saturation.

Another object is to provide a clutch which minimizes the effect of leakage flux during flux changes, for example, at the moment the clutch is being engaged or released, which is the very moment when increased efficiency is most important.

Another object is to provide a magnetic clutch which is self-demagnetizing in action.

The clutch or brake of my invention uses a very thin armature minimizing all of the above effects. It is a coupling which can be excited with a rotating electro-magnetic coil or can be built with stationary magnets, eliminating slip rings. In one embodiment I use a spiral magnetic structure which can be made extremely rugged and is inexpensive to manufacture.

The specific nature of my invention, as well as other objects and advantages thereof, will clearly appear from a description of a preferred embodiment as shown in the accompanying drawings, in which:

FIG. 5 shows the spiral embodiment using a ribbon coil;

FIG. 6 shows a detail of the construction of FIG. 5 taken on line 6—6 of FIG. 5;

FIG. 7 shows an embodiment employing a non-rotating magnetic structure;

FIG. 8 shows a front view of the construction of FIG. 6; and

FIG. 9 shows a coupling using a permanent magnet.

Although the invention will be described in connection with a clutch structure, it will be understood that it is equally applicable to a brake, except that in the case of brakes the magnets can almost always be made stationary and in that case the need for slip rings does not exist.

Figure 1:
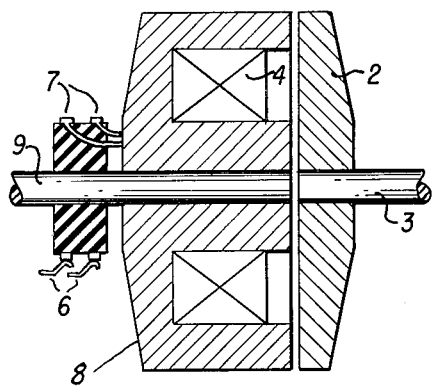
FIG. 1 shows a conventional coupling employing a heavy armature whose cross-sectional area is approximately equal to that of the magnet.

Referring to FIG. 1, the armature 2 is keyed to shaft 3, but axially slidable thereon. When coil 4 is excited by current supplied through brushes 6 to slip rings 7, armature 2 is drawn into contact with field structure 8 which is fixed to shaft 9, thereby coupling shaft 3 to shaft 9.

Examination of FIG. 1 shows that in order to carry the flux supplied by the magnet, the armature 2 should have a cross-sectional area at various points capable of carrying the entire flux without saturation. This results in a heavy and sluggish armature both because of eddy-currents and because of its weight. Laminating the magnetic structure would reduce the eddy-current effect but not the mass. Various expedients to reduce the effects of mass have been tried. Clutches have been built with the output members consisting of thin disks which are pinched by the heavy magnetic members. While this reduces the weight of the output members, the moving armature still remains large and the resulting clutch is complicated and expensive.

Figure 2:
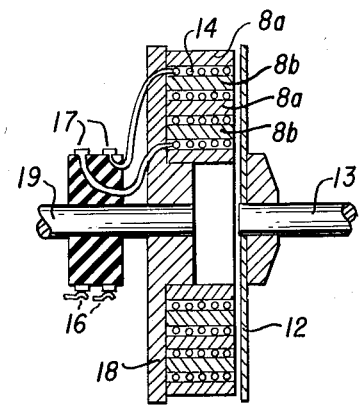
FIG. 2 shows the basic idea of the new clutch where the magnet is divided into many small sections enabling the use of a very thin armature while keeping the overall magnetic forces high.
Figure 3:
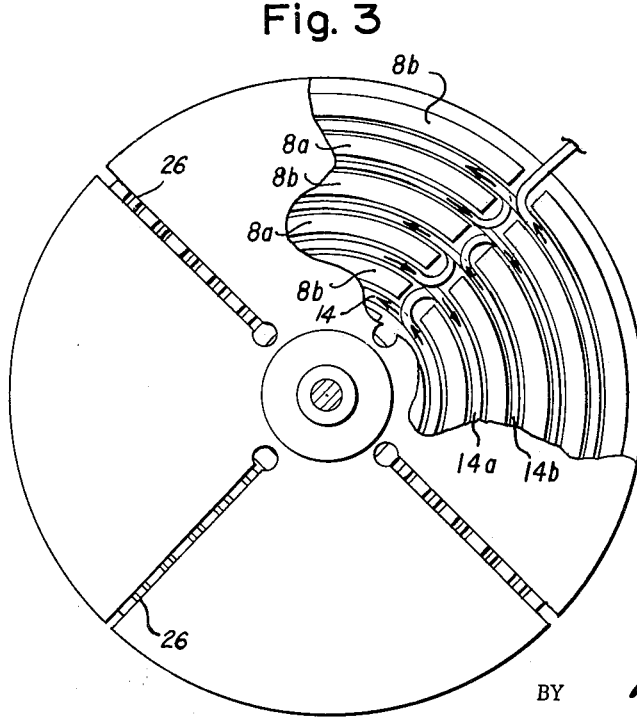
FIG. 3 is a view partly broken away, showing the clutch of FIG. 2 from the armature side.

FIGS. 2 and 3 show the basic principle of my new design. The electromagnet has been split into many annular sections 14a and 14b, of respectively alternate polarity, but so proportioned that the total flux can be made as large as that of the basic simple design of FIG. 1. The enlarged sectional view, FIG. 4, of the pole pieces 8a, 8b points out the further advantage of this design. It will be noted that the armature now need only be one-half as thick as the poles 8a, 8b because the flux from each pole splits into two parts as shown by the arrows. In practice, the armature can be made of thin magnetic material and, because of the small dimensions, the coil can be made of copper or aluminum ribbon interleaved with the annular strips of magnetic material.

FIG. 5 shows schematically another form of the invention wherein the thin magnetic sections are spiralled. Two long, thin strips of magnetic material 21 and 22 are wound in the form of a spiral, with the conductor 23 in the form of a slightly narrower strip of conductive material, sandwiched between them. The conductor strip 23 is folded around one end of magnetic strip 21 so that current in successive layers of strip 23 flows in opposite directions as will be seen from FIG. 5, thus producing opposite poles on successive edges of magnetic strips 21 and 22. It will be understood that conductor strip 23 is suitably insulated as shown in FIG. 6.

Figure 4:
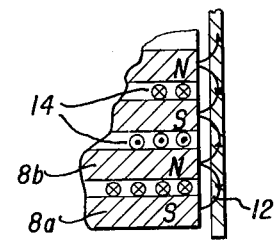
FIG. 4 shows a detail of FIG. 2.

The conductors and magnetic ribbon of the field are wrapped together, suitably insulated from each other, and the whole assembly held together by modern cementing materials or mechanically clamped in any suitable manner. The space between the pole tips is preferably filled with suitable friction material which can also be the impregnating compound as shown in FIG. 6. The armature is a thin disk of constant thickness which can be slotted as shown at 26 in FIGS. 3 and 8 to prevent distortion due to heat and to make it more flexible for self-alignment with the magnetic structure. This assumes that the armature has about the same magnetic saturation value as the pole pieces. If the armature can carry more flux without saturation it can be made thinner, and if it can carry less flux, it may have to be made thicker. There is, of course, no need to make the armature disk thicker than is required to carry all the flux the poles can produce at saturation. If a larger number of turns is needed than that shown in FIG. 5, multiple ribbon layers can be employed, or a winding of conventional round or square wire can be used between the layers of magnetic material as shown in FIG. 4 at 14. In this embodiment, it is easier to use separate circular strips of magnetic material around which are wound one or more layers of wire, over which is placed another strip of magnetic material which, in turn, is again overlaid by a coil of wire and so on. The wire can be continuous since the magnetic rings need not be complete, permitting the wire to go from one layer to the next without breaking.

A detail of the winding is shown in FIG. 3. First the innermost magnetic pole strip 8a, which may be circular without a break, is wound with a layer of turns of thin wire 14, the winding being, for example, counterclockwise. Then the second magnetic pole strip 8b is laid over the winding 14; this strip is of such length that its ends do not quite meet, providing a small gap through which the last turn of wire 14 is passed as shown at 14a. This turn is then reversed, and the second layer of turns 14b is then wound on the second strip, but in the opposite direction to the first, thus providing the necessary alternation of current direction in adjacent "slots" of the multiple pole winding. This process is continued for as many layers (or poles) as required, always reversing the direction of the winding in each slot between adjacent poles. Instead of a gap at the ends of each circular pole strip, it is actually necessary only to provide a small nick large enough to pass the wire 14 from one slot to the next The construction of FIGS. 5 and 6 has an interesting and novel advantage. When a fast build-up of flux is desired, it is important to drive all possible flux into the tips of the poles. The leakage flux which is normally present in this construction has to pass through the conducting ribbon. During a change of flux, this produces circulating currents in the ribbon which oppose the build-up of this leakage flux and thus, in fact, reduces the leakage flux, driving the flux into the pole tips. This is particularly important when very fast build-up of torque is required. In A.-C. operated clutches, this effect is continuous and tends to minimize the leakage flux at all times.

As mentioned earlier, no difficulty with slip rings is present when my invention is used as a brake. In many clutch applications, slip rings are also undesirable. This is particularly true where long life is desired, or freedom from service, or where the clutch is to be used in hazardous atmospheres. For this purpose FIG. 7 shows an embodiment employing a stationary magnetic structure. The magnet now consists of the structure 30 which does not rotate. The pole pieces consist of many thin triangularly shaped members 31, 32 alternately stacked as shown in FIGS. 7 and 8; they are held between annular rings 33 and 34 of magnetic material, which serve a double purpose. These rings provide a magnetic coupling to the stationary magnet 30 and also provide the physical supporting structure for the revolving field pieces 31 and 32. The inner ring can be made integral with a spider or supporting plate 36 which can be mounted on suitable shaft 37. Adjacent triangular pole pieces are separated either by a separating plate 35 which may be a non-metallic friction separator, materials for which are well known to the trade, or they can be separated by a non-magnetic but electrically conductive plate such as aluminum or copper. These plates have the effect of minimizing the effects of leakage flux between the pole pieces during changes in flux, or when the clutch is operated by A.-C., as previously described.

The whole assembly can be held together either by suitable mechanical means such as welding or brazing or it can be held together by suitable cements such as epoxies. The latter was the method actually employed in the first experimental clutch, and appears to be satisfactory.

The magnetic poles 30a can either be made of solid material or can be slotted or laminated to minimize eddy-current effects. The armature 38 can be of the same general style as those shown before as in FIG. 3, except that it may be advisable in some cases to make the slots 26 at an angle to the radius, as shown in FIG. 8, so as not to produce flux pulsations when the clutch is slipping.

One of the advantages of the spiral construction shown in FIG. 5, and, incidentally, of the radial pole structure of FIG. 7, is that when the clutch is slipping the respective elements of the armature 38 alternately contact north and south poles of the magnet. This tends to de-magnetize the armature more completely as the flux is reduced, and also tends to stabilize the value of torque when the flux is increased or changed. Another way of saying this is that the effects of hysteresis are reduced. This is not true of the purely cylindrical construction of FIGS. 1 and 3.

While I have shown all of the clutches and brakes, so far, as being operated by electro-magnetic excitation, permanent magnet control means, well known to the art, can be employed as well. For example, in FIG. 9, I show schematically a ring permanent magnet 41 movable between the clutch structure 42 and a magnetic shunt 43 so that as the magnet is moved axially, the magnetic flux delivered to the clutch can be raised or lowered.

I have shown above several embodiments of a coupling which is designed for very high speed and one that can be built in very large sizes with the speed and other advantages of small clutches or brakes, due to the low inertia of the thin disk which serves as the armature.

It will be apparent that the embodiments shown are only exemplary and that various modifications can be made in construction and arrangement within the scope of my invention as defined in the appended claims.

I claim:

1. A magnetic coupling comprising a magnet member and an armature member attracted into frictional engagement with said magnet member when the coupling is energized, said magnet member comprising a set of closely spaced thin strips of magnetic material constituting alternate pole members, each of said strips having one edge aligned with the corresponding edges of adjacent strips to constitute a multiple pole face, means for spacing adjacent strips of the set by a distance of the same order of magnitude as the thickness of the strips, the unattracted armature being spaced from said pole face by a distance of the same order of magnitude as the thickness of the strips and exciting means for energizing alternate strips of the set with magnetic flux of alternate polarity to attract said armature member so that the face thereof is drawn into frictional engagement with said strip edges.

2. The invention according to claim 1, the thickness of said armature at the engaged surface thereof being of the same order of magnitude as the thickness of individual strips.

3. The invention according to claim 1, the means for energizing the strips comprising a conductive winding occupying the spaces between adjacent strips, and means for supplying current to said winding.

4. The invention according to claim 3, said set of strips comprising at least two spaced, substantially parallel strips wound in a spiral configuration, said conductive winding being in the form of a flat conductive strip insulated from said pole strips and lying between them.

5. The invention according to claim 4, said conductive strip being folded over one end of one of said pole strips to provide current flow in opposite directions in adjacent slots of the multiple pole structure.

6. A magnetic coupling device comprising a relatively stationary magnetic exciting structure including two pole surfaces of opposite polarity, a set of poles movable as a whole relative to said exciting structure, said set comprising spaced, substantially parallel laminations of magnetic material, alternate ones of said laminations being magnetically coupled to one of said two pole surfaces and the other ones of said laminations being magnetically coupled to the other of said two pole surfaces, an armature member movable with respect to said set and adjacent one edge of all of said strips, the spacing between adjacent ones of said laminations being of the same order as their thickness, and said armature member being of the same order of thickness as said laminations.

7. The invention according to claim 6, said pole surfaces being opposed annular surfaces, means for rotating said set of poles within the space within said annular surfaces, said armature being rotatable about an axis co-linear with the axis of rotation of said set of poles, and means for moving said armature axially toward said set of poles upon energization of said exciting structure.

References Cited in the file of this patent

UNITED STATES PATENTS

| | | |
|---|---|---|
| 1,568,024 | Spencer | Dec. 29, 1925 |
| 1,667,766 | Bing | May 1, 1928 |
| 2,319,270 | Simmons | May 18, 1943 |
| 2,525,571 | Winther | Oct. 10, 1950 |
| 2,761,094 | Frampton | Aug. 28, 1956 |
| 2,910,589 | Van Dorsten | Oct. 27, 1959 |
| 2,947,921 | Watelet | Aug. 2, 1960 |

FOREIGN PATENTS

| | | |
|---|---|---|
| 2,349 | Great Britain | May 18, 1882 |